Feb. 17, 1970   A. JULY   3,495,851
SELF-COUPLING TRACTOR HITCH
Filed Jan. 10, 1968   2 Sheets-Sheet 1
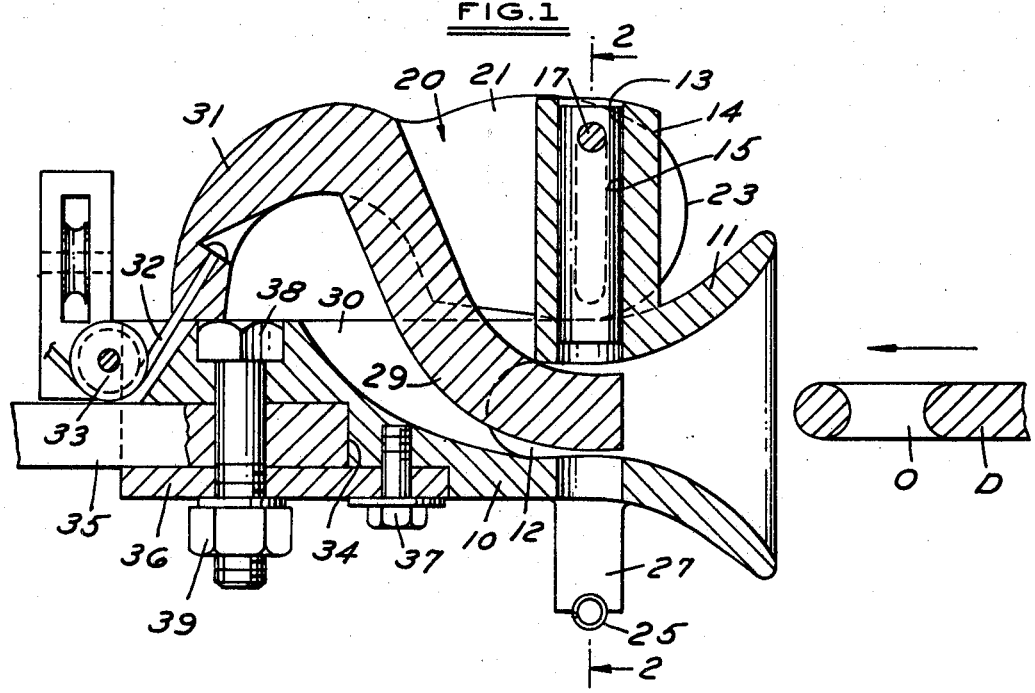
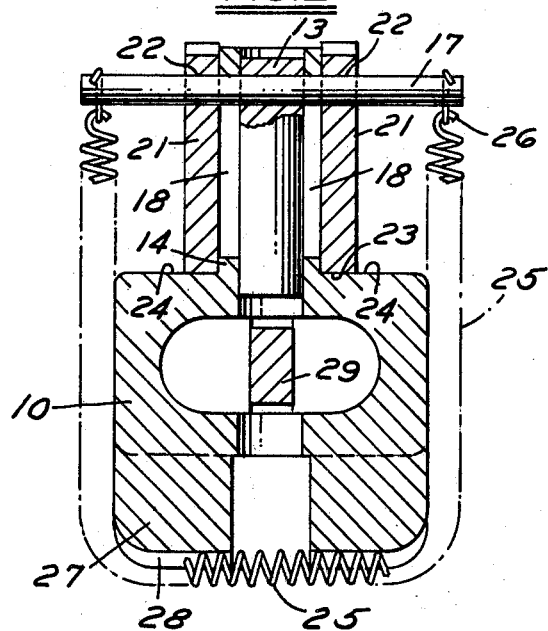
INVENTOR
ALBERT JULY
BY
Barnes, Kisselle, Raisch & Choate
ATTORNEYS Feb. 17, 1970 A. JULY 3,495,851
SELF-COUPLING TRACTOR HITCH
Filed Jan. 10, 1968 2 Sheets-Sheet 2

INVENTOR
ALBERT JULY
BY
Barnes, Kisselle, Raisch & Choate
ATTORNEYS

3,495,851
SELF-COUPLING TRACTOR HITCH
Albert July, 1814 Mable, Flint, Mich. 48506
Filed Jan. 10, 1968, Ser. No. 696,924
Int. Cl. B60d 1/10
U.S. Cl. 280—510    13 Claims

ABSTRACT OF THE DISCLOSURE

The tractor hitch disclosed herein comprises a body having an integral funnel portion for guiding a draw bar of a trailer or implement into position for engagement by a draw pin which is mounted on the body. A cam member cooperating with cam surfaces on the body is connected to the draw pin and in one position holds the draw pin out of engagement with the draw bar and in another position holds the draw pin in engagement with the draw bar. Spring means is provided for holding the cam member and in turn the draw pin out of draw bar engaging position. A trip member on the cam member projects into the path of the draw bar so that when the draw bar engages the trip member, the cam member is moved sufficiently to permit the spring to move the cam member and in turn the draw pin into draw bar engaging position. Cable means are provided for returning the cam member and draw pin to position wherein the draw pin is out of engagement with the draw bar.

---

This invention relates to hitches and particularly to tractor hitches for connecting to the draw bar of a trailer or implement.

Among the objects of the invention are to provide a hitch which is relatively simple, easy to operate, has a minimum of parts, is sturdy, will readily engage and disengage the draw bar of a trailer or implement, and is easy to maintain.

In the drawings:

FIG. 1 is a longitudinal sectional view of a tractor hitch embodying the invention.

FIG. 2 is a sectional view taken along the line 2—2 in FIG. 1.

Figure 3:
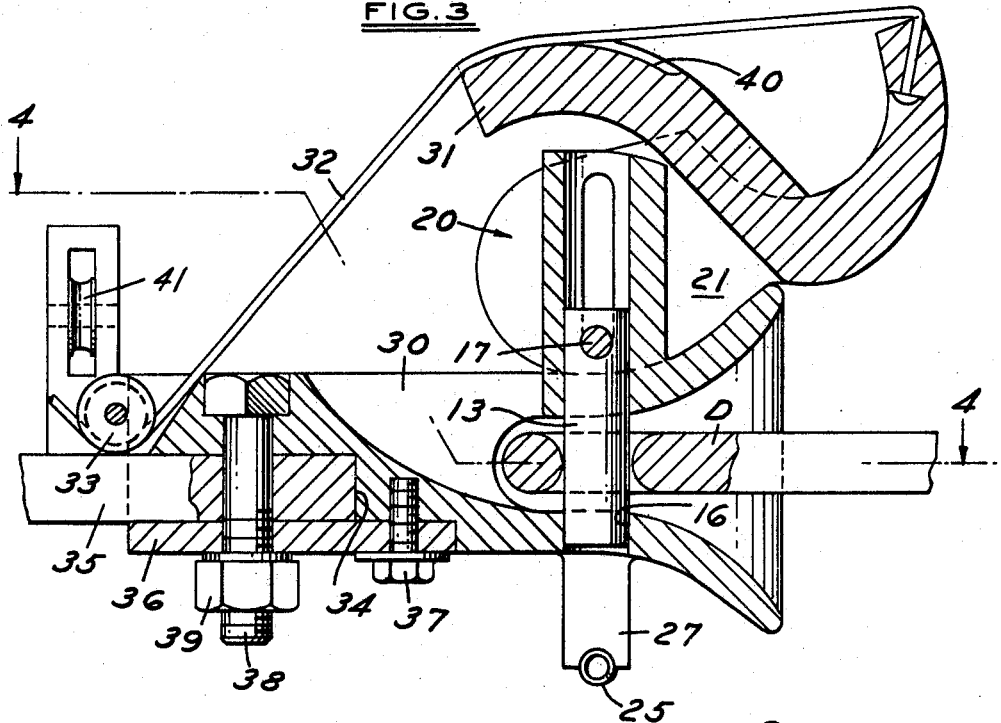
FIG. 3 is a view similar to FIG. 1 showing the parts in draw bar engaging position.
Figure 4:
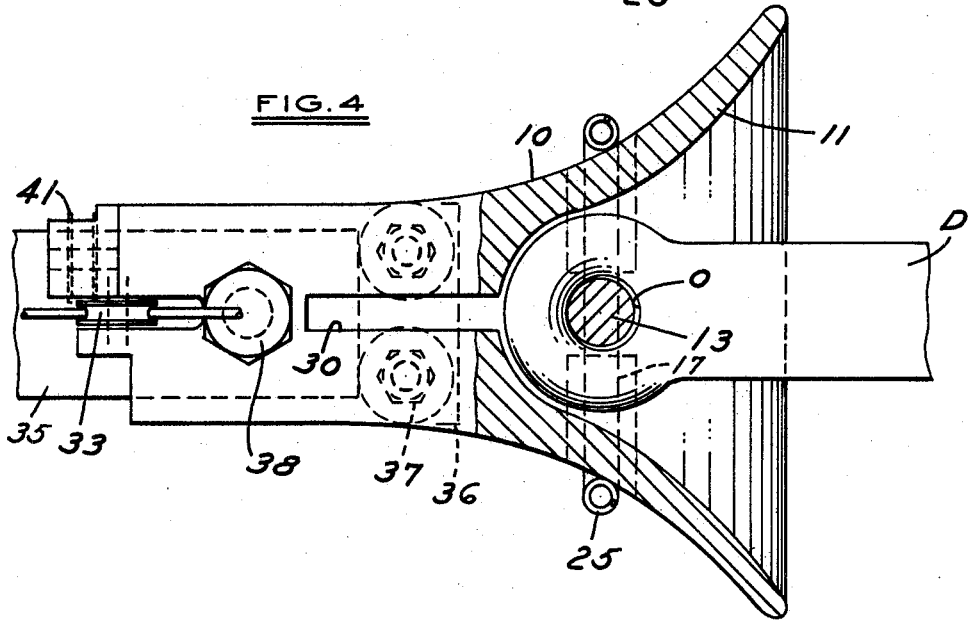
FIG. 4 is a fragmentary sectional view taken along the line 4—4 in FIG. 3.

Referring to FIGS. 1 and 2, the tractor hitch embodying the invention comprises a body 10 that has a funnel portion 11 at one end for guiding the draw bar D of a trailer or implement into the space 12 for engagement with a draw pin 13. Body 10 includes an upwardly extending projection 14 having an opening 15 that guides the draw pin 13 for movement into and out of the space 12. When the draw pin moves downwardly into the space 12, the lower end thereof engages an opening 16 (FIG. 3).

As shown in FIG. 2, a rod 17 extends transversely through the pin 13 and slots 18 in the projection 14. A cam member 20 having spaced cam portions 21 on opposite sides of the projection 14 is provided on the exterior of the body and the rod 17 extends through openings 22 that are eccentrically positioned with respect to the arcuate cam surface 23 of each cam portion 21. The cam surface 23 of each cam portion 21 cooperates with a cam surface 24 on the body 10. A tension spring 25 encircles the body 10 and has its end 26 connected to the rod 17. As shown in FIGS. 1 and 2, a downwardly extending projection 27 is provided on the body 10 and has a transverse groove 28 for guiding and holding the spring 25 in position.

As shown in FIGS. 1 and 3, cam 20 includes a trip portion or member 29 that extends outwardly from the cam portions 21 and in one position of the cam member extends through an opening 30 in the body with its free end in the space 12 for engagement by the draw bar D. The cam member 20 further includes a stop member 31 that extends outwardly from the cam portions 21 and in one position is shown in FIG. 1 engages the body 10. A cable 32 is connected to the stop memebr 31 and is trained over a pulley 33 rotatably mounted about a transverse axis at the forward end of the body 10.

Body 10 includes a cutaway portion 34 for receiving the draw bar 35 of the tractor or vehicle. A holding plate 36 is provided on the lower end of the body 10 and is held in position by a bolt 37. The tractor hitch itself is held on the draw bar 35 by a bolt 38 and nut 39.

In the position shown in FIG. 1 the hitch is ready for engagement with the draw bar D. The tractor or vehicle on which the hitch is mounted is backed toward the draw bar D. When the draw bar D engages the free end of the trip member 29, it swings the trip member 29 forwardly or to the left as viewed in FIG. 1 sufficiently to rotate the cam member 20 about pin 17 into an unstable position with respect to the cam surfaces 23, 24 so that spring 25 will thereafter continue the movement of the cam member 20 bringing the draw pin 13 downwardly to the position shown in FIG. 3 through the opening O of the draw bar D. As shown in FIG. 3 the draw pin 13 is stopped in its movement by final engagement of the cam portions 21 with the funnel portion 21. In this position the draw pin 13 is positively held in the body 10 and locks the draw bar D.

In order to release the draw bar the cable 32 is grasped by the operator and pulled forwardly to return the cam member 20 to the position shown in FIG. 1 wherein the stop 31 engages the body 10 and holds the cam member 20 in position for reengagement with the draw bar D. As shown in FIG. 3, the stop member 31 includes a slot 40 in the periphery thereof for guiding the cable 32.

It should be understood that the cable extends to the position of the operator on the tractor or vehicle. Where the tractor is mounted in inverted position, an additional pulley 41 is provided over which the cable can be trained to clear the draw bar 35 and so that the cable can pass freely up to the operator.

I claim:
1. In a hitch for connecting to a draw bar of a trailer or implement, the combination comprising
 a body,
 guide means for the draw bar,
 a draw pin,
 means for mounting the draw pin on the body for movement into and out of the guide means for engagement and disengagement with the draw bar,
 a cam on said body,
 said body and cam having interacting cam surfaces,
 a trip member fixed to said cam and extending into said guide means for engagement by the draw bar,
 biasing means acting on said cam to urge said cam toward said body,
 said interacting cam surfaces having a configuration such that in a first position of said cam, said draw pin is held out of the space in said guide means, and in a second position of said cam, said draw pin is held in position for engagement with said draw bar.

2. The combination set forth in claim 1 including means connected to said cam for returning said cam to the first position wherein said draw pin is out of engagement with said draw bar and the trip member is in the path of said draw bar.

3. The combination set forth in claim 1 wherein said means for connecting said cam to said draw pin comprises a transverse rod.

4. The combination set forth in claim 3 wherein said biasing means comprises a spring extending between said rod and said body.

5. The combination set forth in claim 3 wherein said biasing means comprises a tension spring encircling said body and having its ends connected to said rod to thereby apply tension to said rod to urge said rod and said cam toward said body.

6. In a hitch for connecting to the draw bar of a trailer or implement, the combination comprising a body, said body having a portion defining a funnel-shaped guide for guiding a draw bar into position for engagement with a draw pin, means on said body for guiding said draw pin for movement transversely of said funnel means into engagement with the draw bar positioned in said funnel means, said body having a cam surface thereon, a cam member engaging said surface, rod means extending through said draw pin and said cam member, spring means engaging said rod means and urging said rod means in a direction toward a position wherein said draw pin engages a draw bar when a draw bar is in position, the interengaging surfaces of said cam and said body having a configuration such that in a first position of said cam, said draw pin is held out of the space in said guide means, and in a second position of said cam, said draw pin is held in position for engagement wth said draw bar, said cam member having an integral trip portion which in one position of said cam member extends into said funnel means for engagement by the draw bar, said biasing spring means operable in a manner such that when the draw bar engages said trip portion, said cam member is moved sufficiently to permit said spring means to cause said cam member to follow the cam surface on said body and thereby permit the spring means to move the draw pin into the path of the draw bar for engagement with the draw bar.

7. The combination set forth in claim 6 wherein said cam member includes an integral stop portion engaging the body when the trip portion is in position for engagement with the draw bar.

8. The combination set forth in claim 7 including cable means connected to said stop portion for returning said cam to the first position wherein said draw pin is out of engagement with said draw bar and the trip member is in the path of said draw bar.

9. The combination set forth in claim 8 wherein said trip portion has a slot therein for engagement with said cable means for guiding said cable means when the draw pin is in draw bar engaging position.

10. The combination set forth in claim 6 wherein said means for guiding said draw bar comprises an integral portion having an opening therein into which said draw pin extends.

11. The combination set forth in claim 6 wherein said cam member has spaced cam portions on opposed sides of said projection, said body having individual cam surfaces for each of said cam portions.

12. The combination set forth in claim 6 wherein said spring means comprises a tension spring encircling said body and having its ends connected to said rod means for urging said rod means and said cam member toward said body.

13. The combination set forth in claim 12 including means on said body for guiding said rod member for movement in a direction generally parallel to its axis.

References Cited

UNITED STATES PATENTS

| | | | |
|---|---|---|---|
| 1,635,659 | 7/1927 | Clement | 280—510 |
| 1,692,071 | 11/1928 | Austin et al. | 280—515 |
| 1,860,973 | 5/1932 | Yeakel | 280—510 |
| 2,072,239 | 3/1937 | Zeindler | 280—509 |
| 2,442,439 | 6/1948 | Schultz | 280—508 |
| 2,556,748 | 6/1951 | Buckley | 280—515 |
| 3,330,579 | 7/1967 | Tantlinger | 280—508 |

LEO FRIAGLIA, Primary Examiner

LESLIE J. PAPERNER, Assistant Examiner